(12) United States Patent
Weber

(10) Patent No.: US 7,761,628 B1
(45) Date of Patent: Jul. 20, 2010

(54) UNITIZED KEYBOARD AND DISPLAY FOR DESKTOP PERSONAL COMPUTER SYSTEM

(75) Inventor: Harold J. Weber, Centerville, MA (US)

(73) Assignee: SavvyStuff Property Trust, Centerville, MA (US)

( * ) Notice: Subject to any disclaimer, the term of this patent is extended or adjusted under 35 U.S.C. 154(b) by 638 days.

(21) Appl. No.: 11/698,919

(22) Filed: Jan. 29, 2007

(51) Int. Cl.
*G06F 13/12* (2006.01)

(52) U.S. Cl. ............... 710/64; 710/2; 710/5; 710/62; 709/208; 709/209

(58) Field of Classification Search ............ None
See application file for complete search history.

(56) References Cited

U.S. PATENT DOCUMENTS

| | | | | |
|---|---|---|---|---|
| 6,044,452 | A * | 3/2000 | Birch et al. | 712/28 |
| 6,166,734 | A * | 12/2000 | Nahi et al. | 715/748 |
| 6,473,789 | B1 * | 10/2002 | Chen et al. | 709/213 |
| 7,305,501 | B2 * | 12/2007 | Lee | 710/62 |
| 2005/0066229 | A1 * | 3/2005 | Karaoguz et al. | 714/11 |
| 2006/0265607 | A1 * | 11/2006 | Liang | 713/300 |

* cited by examiner

*Primary Examiner*—Eron J Sorrell

(57) ABSTRACT

A conjoined portable display monitor and portable keyboard similar to the arrangement of a laptop style portable computer are used to provide user interface for a desktop personal computer or workstation. The portable display monitor is configured to receive video data signals from the desktop computer, while the portable keyboard and associated mouse are configured to deliver their signals to corresponding inputs of the desktop computer. The arrangement retains the space-saving advantages of a portable computer's embodiment with the enhanced performance and available options of a full-sized desktop computer. An example mode of this teaching shows a portable computer adapted to receive video signals from and deliver keyboard signals to conventional data-signal ports inherent with the desktop computer system. The user may return the portable computer's signal ports to a conventional mode and continue usage as a conventional self-contained portable computer.

20 Claims, 8 Drawing Sheets

UNITIZED KEYBOARD AND DISPLAY FOR DESKTOP PERSONAL COMPUTER SYSTEM

FIELD OF INVENTION

My invention generally pertains to a keyboard and a monitor display of the type ordinarily used with a desktop or tower computer system. My invention further relates to portable laptop or notebook computers which may be adaptively utilized in conjunction with the desk-top or tower computer in order to gain the data processing power inherent in a larger, desktop or tower computer while retaining the advantage of the lap-top computer's less bulky display and keyboard combination which requires less desk top space. Adaptation of a notebook computer to serve as a user-interface facility is uniquely implemented by disassociating the computational and data storage aspects of the notebook computer from the functions of the keyboard and display panel. This accommodation is delivered by re-directing the usual notebook computer's video-output port to serve as a video-input port and the usual external keyboard input port to serve as a keyboard (and mouse) signal line output port.

SYNOPSIS

In my invention's operating scenario, a user is ordinarily provided with a desk-top or tower computer principally containing a microprocessor based motherboard, semiconductor memory, accessory interface function circuitry, a hard disk drive, a floppy-disk drive, a cd-rom (or dvd) drive and a power supply.

My invention's novel improvement is to utilize a combination of the usual keyboard, mouse and display monitor configured similar to the form of a ubiquitous notebook or laptop computer's embodiment style and feel. The result of my teaching is to gain the space-saving compactness of the note-book computer's configuration while accessing the data processing power and storage capacity of a full-sized office computer.

More extensively, my teaching allows that the keyboard and display may actually be modified portions of a notebook computer of quite ordinary design. I show re-engineering the notebook computer to effectively disenable the usual data processing and storage functions and favorably redirect the usual video output port as a video input port coupleable with the desktop computer's video output port. The re-engineering includes redirecting the external keyboard input port as a keyboard data signal output port, coupleable with the desktop computer's usual keyboard input port.

By judicious selection, a user may opt either to utilize the notebook in a conventional manner as intended or else to extend the keyboard, mouse and display functions to provide interface with the desktop computer or workstation's portal facilities.

BACKGROUND OVERVIEW

A user of a "desk-top" or office-based personal computer regardless or make or model soon experiences the clutter of a "desk-full" of hardware and cables. This includes the keyboard, the usual monitor whether the older CRT or the less bulky LCD type and a mouse. Each of these user interface accessories usually have cables and wires scattered-about that connect to their respective ports on the hind-side of the computer's tower or desk-top base unit.

My invention affords a superior degree of convenience and a riddance of the workspace clutter by unitizing the keyboard, the display monitor and the mouse into a singular readily portable hardware apparatus not unlike the configuration afforded by a common laptop or notebook computer. I extend my invention to include adaptation of a portable computer for the application or to provide the display and keyboard functions in a conjoined portable construct void of data processing or storage capability.

Generally speaking my teaching allows the clutter-reducing melding of the keyboard and display afforded by a notebook computer's configuration with the optimal speed, computational power and storage capacity of a conventional desktop computer or office workstation.

I recognize that previous attempts for using a personal computer in association with a desktop computer have been accomplished, but I find only to the extent of utilizing the existing port connections (e.g., the serial RS232C connection afforded by the COM ports long associated with generic IBM-type PC computers. The installation of interlink software enables a portable personal computer to at least perform as though it were merely a "dumb terminal" when intercoupled with the desktop computer via the serial COM port. My present invention advances far beyond this "serial port" interface, in that by reconfiguring the notebook computer's usual ports, they may connect directly to the desktop computer's usual keyboard input and video output ports and fully supplant the structurally separate external keyboard and display used with the typical desktop computer installation. The result is the smaller footprint of the notebook computer's usual integrated display and keyboard arrangement contribute a considerable savings in valuable workstation space.

BENEFITS OF INVENTION

The main goal and hence the main benefit to a user of my invention presently pertains to a capability for utilizing the compact arrangement of an integrated display, keyboard and mouse typified by a contemporary portable notebook computer to new advantage. The main advantage is the obvious reduction of desk-top clutter by consolidation of two space-wasting devices into one functionally consolidated device coupleable with a usually stationary desktop computer or workstation. Properly practiced, this approach can lead to a reduction in the amount of clutter laying about a workperson's desk. In another approach, the interface of the video display and the keyboard monitor may be "wireless" while still sporting the spirit of my invention's objectives.

Another benefit reaped by my teaching is the ability to utilize the additional computational power of a desk-top or tower type of personal computer without compromise of the convenience for the user interface being practiced in the convenient form-factor of a portable computer's arrangement. Most particularly, as it is well known, a tower or desk-top computer may sport relatively large power supply capability contributing to the inclusion of ever-faster processors and larger-size fast memory as necessitated by advances in operating system and program performance levels. Furthermore, the larger form-factor and additional power-supply capability of desktop and tower mainframe constructs allows for additional hard-drive capacity and CD-ROM or DVD drives. It is well known that the power supply capacity of portable computer's in general places a limit on their expansion or performance increases to approach the extent of a desktop or tower computer's inherent capability.

PROBLEM SOLVED BY INVENTION

A workperson may gain the full-power capability of an ordinary desk-top or tower computer's mainframe while operating with the less cumbersome interface convenience of a laptop or notebook computer's user interface configuration. What I realized was that keyboards and displays are most commonly marketed as disjoined components when associated with usual "office computers". Hence, my teaching addresses bringing the best convenience and classic form-factor features of a notebook computer to be functionally combined with the power, performance and expansive capability of the larger and usually fixed-location tower or desktop mainframe. In effect, my teaching shows the combining of an LCD monitor and a keyboard as one integrated unit that may conventionally connect with the usual ports provided on a conventional personal computer of pre-existing design.

I also recognized that the usual notebook computer favored by so many users may be readily re-engineered to operate either as the user interface afforded by the essence of my invention, or alternatively it may continue to be used as a portable computer as originally designed.

A typical portable computer includes several ports on its backside. One port is a DB15 SVGA-video connection for hooking-on an external display. Another port is usually a 6-pin DIN (PS-2) connector for attaching an external keyboard. Sometimes a second DIN connector is provided to attach a regular mouse. In my teaching, I provide that these existing ports may be used for their conventional intent and also extended to satisfy the central proposition of my present invention.

Usually the DB15 video display connection provides an output signal suited for driving another external display. In my invention, I instruct reversing the signal flow to intake video signals delivered from an outboard desktop computer's video card. The result would be a GUI display delivered from the desktop computer's program.

Extending this further, the mini-DIN connection provided for an external keyboard or mouse may likewise be redirected to output the keyboard and mouse signals originating from the portable computer's keyboard and mouse.

In other words, the signal path direction provided by the DB15 and mini-DIN connections are in effect, reversed. This unique change allows the personal computer to function as a user interface for a desktop computer having more profound motherboard performance and capable of handling a plurality of hard drives and disk drives, as well as accepting special purpose interface cards or superior video cards.

I also find that contemporary keyboard and mouse connections may be routed by Universal Serial Bus (e.g., USB-1.1 or USB-2.2) interface. Knowing this, I realize that the USB line typical of an ordinary notebook computer may be rerouted to extend the keyboard and mouse data signals to find a path directly to the USB port on the desktop computer or workstation.

I believe that there will continue to be a substantial performance advantage afforded by desktop computers relative with notebook computers, probably due to their inherent advantage of having more power supply muscle and obviously better cooling capability. Notebook computers are also inherently less expandable than desktop computers. Therefore, my present teaching services the space conscious workperson with a less cumbersome workspace intrusion by way of the combined monitor and keyboard configuration. It also enables the workperson or other user to attain the best possible computing performance from the latest processing and storage hardware capability of a "full-size" desktop computer mainframe.

SUMMARY OF INVENTION

A new level of user-interface convenience is now extended to an operator of an office computer. A central intent is to minimize the clutter in the user's workspace. Riddance of the separate keyboard, mouse and monitor/display is central to this invention.

I find that the form of an ordinary laptop style portable computer is extraordinarily advantageous for many office or home environments. The consolidated keyboard and monitor take-up less valuable space on a desk surface. Fewer wires or "coil cords" abound. The drawback is that the computer's performance is tied to the computational capability of the portable computer's processor and motherboard limitations. Mostly these limitations are introduced by matter of power supply capability and cooling (heat build-up) constraints.

I realized that the novel combination of a notebook computer's keyboard and monitor arrangement directly interfaced with a desktop computer's mainframe capability approaches providing the ideal tradeoff of saving desk space, reducing clutter and gaining the raw computing power and storage capacity of a larger tower or desktop computer's capability.

In a most elemental form, the ordinary notebook computer may be reduced to little more than a monitor and keyboard combination. Video signals from the stationary desktop computer may drive the LCD display of the portable computer's arrangement. In a similar manner, the keyboard and mouse signals may convey directly to corresponding inputs of the stationary computer.

MODE 1 EXAMPLE

My device is configured as combined display, keyboard and mouse having a form-factor akin to a conventional portable computer. In such an arrangement, video signals arrive from the desktop computer to provide screen images. Likewise, the keyboard scan-data signals and the mouse movement signals are conveyed to the desktop computer's corresponding input ports. In this arrangement the combination monitor and keyboard user interface is dedicated and is devoid any inherent data processing or storage capability.

MODE 2 EXAMPLE

My device is configured as a "modified" portable computer, where the usual video output port on the portable computer is reconfigured as a video input port to receive video data from the desktop computer for display on the built-in LCD monitor. Likewise, the usual keyboard and mouse "input" ports are reconfigured, functioning instead as "output" ports connective with the corresponding input ports on the desktop computer. In this arrangement, I believe that the video port as well as the keyboard and mouse ports may be skillfully engineered to be selectively reversible. That is to say, upon the user's option, the modified portable computer may still be used as a notebook or laptop computer by retaining it's internal computational and storage capability.

MODE 3 EXAMPLE

My adapter is configured to allow the user to utilize a "modified" portable computer, arranged as in the preceding Mode example. However in this Mode 3 example, the interface between the video, keyboard and mouse ports is linked by wireless signals. Clearly the linking of the video signal from the desktop computer to the modified portable computer's video "input" provision is within the capability of current local area networking (LAN) art, (expressed by the IEEE 802.11 LAN specifications) albeit it's implementation hardware may differ from that which is readily available over-the-counter. This is what part of this invention is about. This Mode 3 arrangement rids the workperson's desktop of all the usual keyboard or monitor related wires and cables, resulting in a dramatic reduction of desk clutter.

What this Invention "is" and "is-not"

This invention "is not" about a "dumb-terminal" arrangement. It differs in that the signals delivered to and from the user interface (e.g., portable keyboard) are specifically engineered to replicate the usual signal specifications of a mouse, keyboard and video monitor. This crafting with "standard" port connections allows for unmodified application with any of a wide variety of personal computer desktop system consoles. Such consoles might be typified by a Dell Precision 690 Workstation (Dell Inc., Dallas, Tex. 75222-4588), or HP Desktop DX2250 (Hewlett-Packard, Inc., Palo Alto, Calif.).

This differs from a conventional "dumb terminal" in that generally speaking, a "dumb terminal" or even a "smart terminal" connects with the mainframe computer via a data bus cable (e.g., a RS232C serial bus port or the like). Ordinarily in such terminals, all the video and the keyboard data flow over the same data-bus line. This fundamental constraint clearly disallows application of dumb-terminal hardware with ordinary personal computer configurations having dedicated keyboard, mouse and video ports.

More particularly, this invention is not about a hand-held data entry terminal having limited capability for typing-in and displaying ordinary office data, such as routine word-processing projects including letters, accounting spread sheets and the like.

This invention "is" about an apparatus which associates with a conjoined keyboard and video display physically configured similar to the usual embodiment of a conventional notebook-style of portable computer. The novel improvement is brought forth by in effect, providing the conjoined apparatus with a video signal INPUT provision for receiving video signals from the desktop computer for display on the monitor portion of the apparatus. A furtherance of this invention includes the OUTPUT of keyboard and mouse signals for coupling with correspondent input ports conventionally included in the attendant desktop computer. Best described, this teaching provides that the efficient keyboard and display configuration typical of a portable computer may be utilized as the user interface station for addressing a more powerful desktop computer machine. In this invention, this adaptation is obtained by specifically redirecting the signal-flow direction from the several ports ordinarily associated with a portable laptop style of computer.

OBJECTIVES OF INVENTION

An objective of my invention is to adapt an ordinary arrangement of a monitor and a keyboard found in the usual portable computer to satisfy the signal port requirements of a standard (full-size) personal computer.

A purpose of my invention is to allow a workperson to operate a full-size personal computer from a conjoined keyboard and LCD display apparatus similar to that of a typical portable computer.

A gist of my invention is to allow a user to redirect the port signal flow directions for video and keyboard signals associated with a portable computer, thereby enabling the portable computer to receive video images directly from a desktop computer and to deliver keyboard and mouse signals directly to the corresponding input ports of the desktop computer.

A key purpose for my invention is to allow wireless linkage of video signals from a desktop computer to the input of a conjoined LCD display and portable keyboard arrangement while concurrently allowing wireless linkage of the keyboard data signals and mouse signals with the desktop computer inputs.

The spirit of my invention is to retain the space-saving attributes of a conjoined keyboard and display typified by a portable notebook or lap-top computer while at the same time accessing the processing power and immense storage capability of a desktop computer system's hardware.

A further goal is to broaden the capability of a notebook personal computer to attain the increased capability of a more powerful desktop computer with direct interactive interface via the keyboard and while receiving video data directly from the desktop computer.

It is an important intent to provide the advantages of a portable computer's conjoined, space saving arrangement of keyboard and LCD display while accessing the speed and power of a full-size desktop system, including most particularly increased memory capability and better latitude of video card processing options attendant with the desktop system.

Yet another consideration of my invention is to adapt a keyboard and flat-panel display of an ordinary notebook computer as the user interface for a desktop computer by disabling the usual computational and storage elements of the notebook computer and redirecting the display to accept portal transfer of video signals from the desktop computer and further to redirect the external keyboard port to deliver keyboard and mouse data output signals from the notebook computer's keyboard and mouse port to the keyboard input port and mouse input port of the desktop computer.

My invention intends that a user may find better usability and satisfaction of a desktop computer or workstation apparatus by supplanting the clumsy scatter of wires and cable associated with separate monitor, keyboard and mouse embodiments with a single conjoined display and keyboard apparatus that may neatly couple with the usual video, keyboard and mouse inputs of an ordinary full-sized desktop computer system.

A remaining object of this invention is to interface the conjoined display and keyboard to accept video signals delivered from the desktop computer and furthermore to convey keyboard and mouse data signal command via a Universal Serial Bus (USB) input port on the desktop computer.

DESCRIPTION OF DRAWINGS

My invention is depicted by 00 sheets of drawings showing 00 figures, including.

DESCRIPTION OF INVENTION

Figure 1:
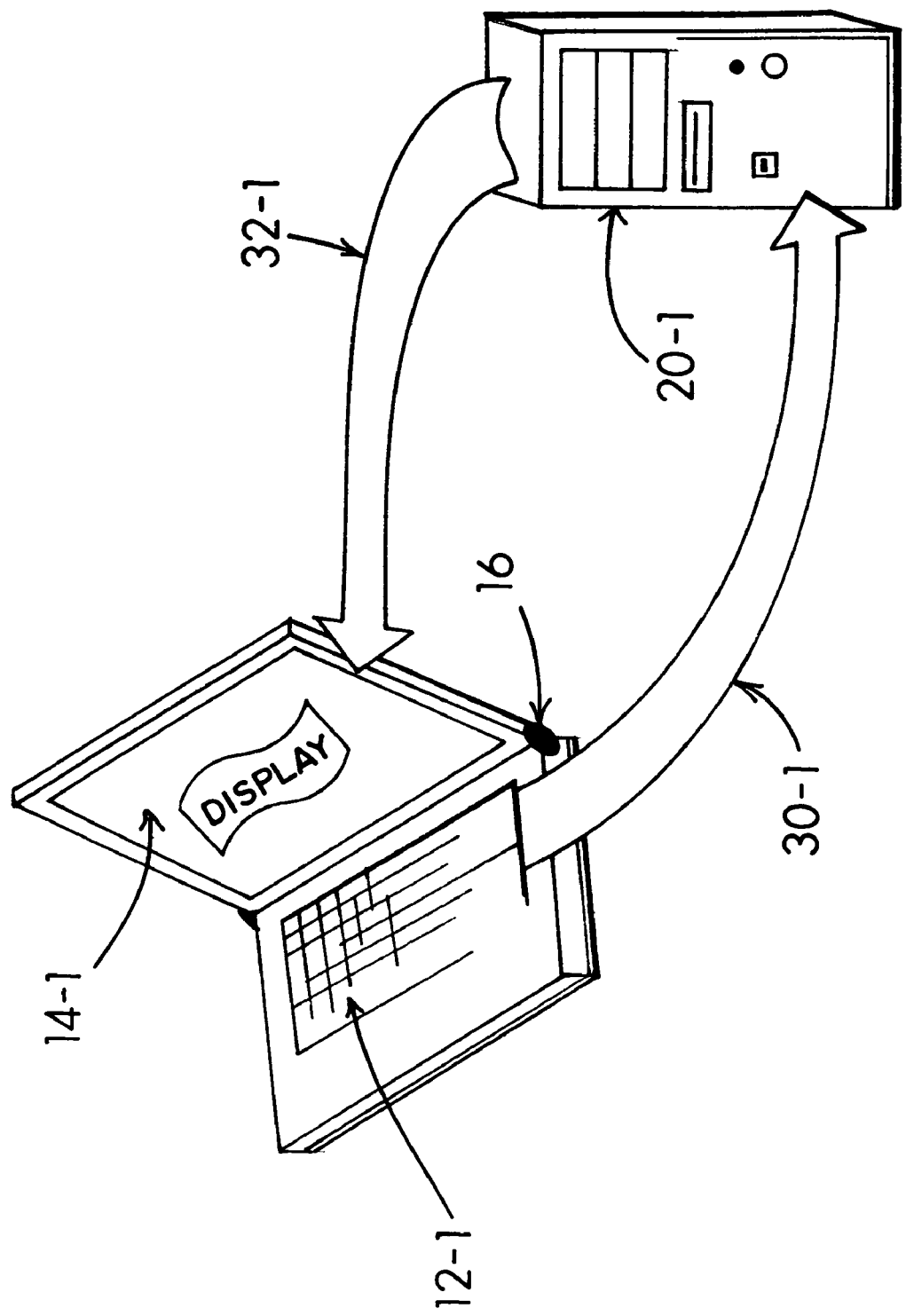
FIG. 1—An overall view showing a portable, unitized keyboard and display utilized as a user interface for a desktop computer.

A notebook computer 10-1 is shown used in conjunction with a desktop (tower) computer 20-1 in FIG. 1. The keyboard portion 12-1 of the notebook computer provides keyboard data signals coupled 30-1 directly with the desktop computer 20-1. Observe that the desktop computer 20-1 delivers its display video 32-1 directly to the notebook computer's usual flat-panel display 14-1. It is further anticipated that the keyboard 12-1 and the display 14-1 may merely function as the portable keyboard and the portable display components preclusive of processing, memory or storage elements and conjoined 16 as though they were one assemblage 10-1.

Figure 2:
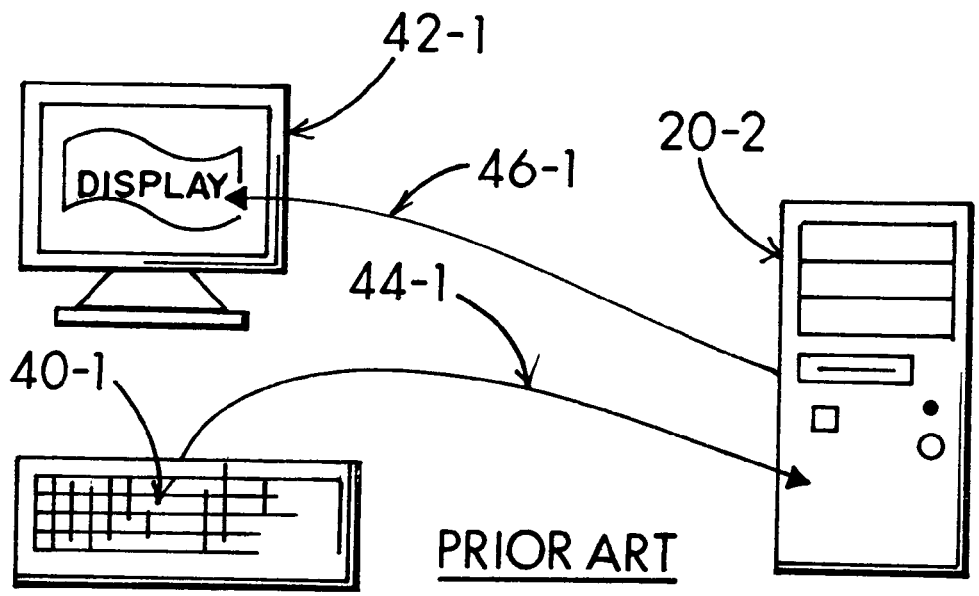
FIG. 2—A prior art configuration for a desktop computer having separate keyboard and display monitor.

A conventional prior art arrangement for a desktop computer 20-2 is depictively preconized by FIG. 2 to include a keyboard 40-1 coupled 44-1 with the computer's "keyboard port" and further to have a video signal (cable) coupling 46-1 with a usually separate display 42-1. Although not shown, it is prosaic to include a mouse as an accessory associated with the keyboard.

Figure 3:
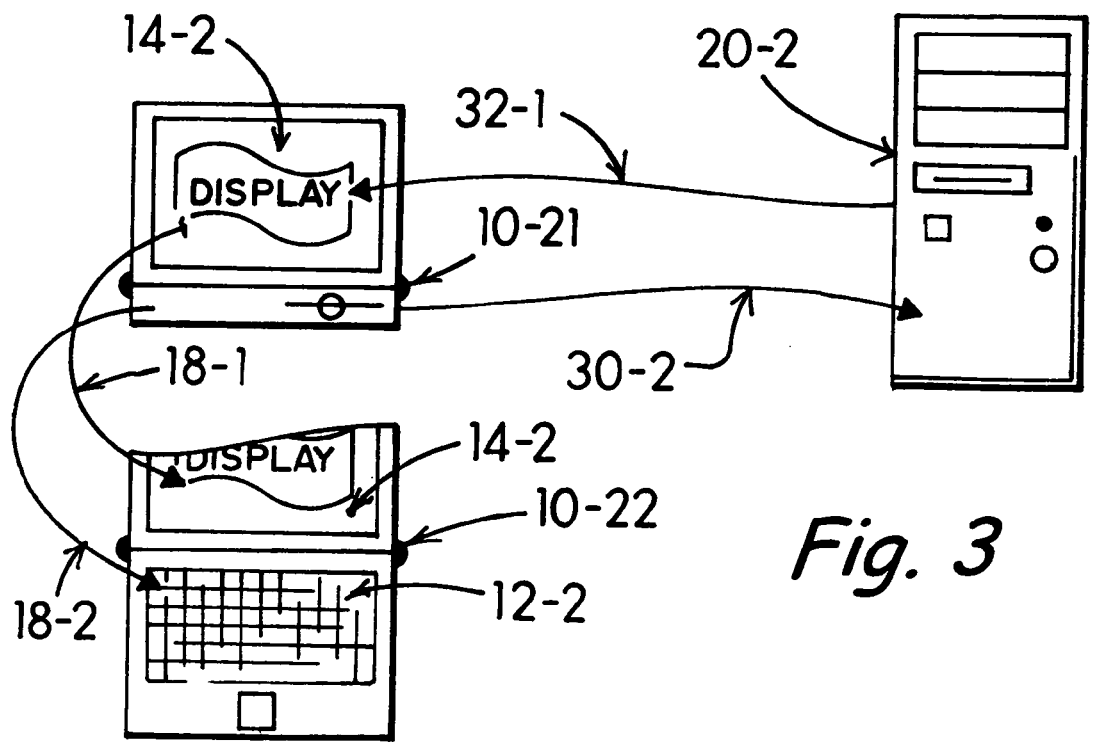
FIG. 3—An unitized keyboard and flatpanel display user interface coupled with a tower style desktop computer.

A notebook computer 10-21 used with the desktop (tower) computer 20-2 is further shown in FIG. 3 to utilize the notebook computer's keyboard 12-2 and display 14-2 portions. The keyboard 12-2 couples 30-2 to the keyboard input port of the desktop computer 20-2, while the video output from the desktop computer couples 32-1 with the display 14-2. The variant arrangement 10-22 shows the portable computer with the display about the same plane as the keyboard, while the arrangement 10-21 shows the display about vertical relative with the keyboard.

Figure 4:
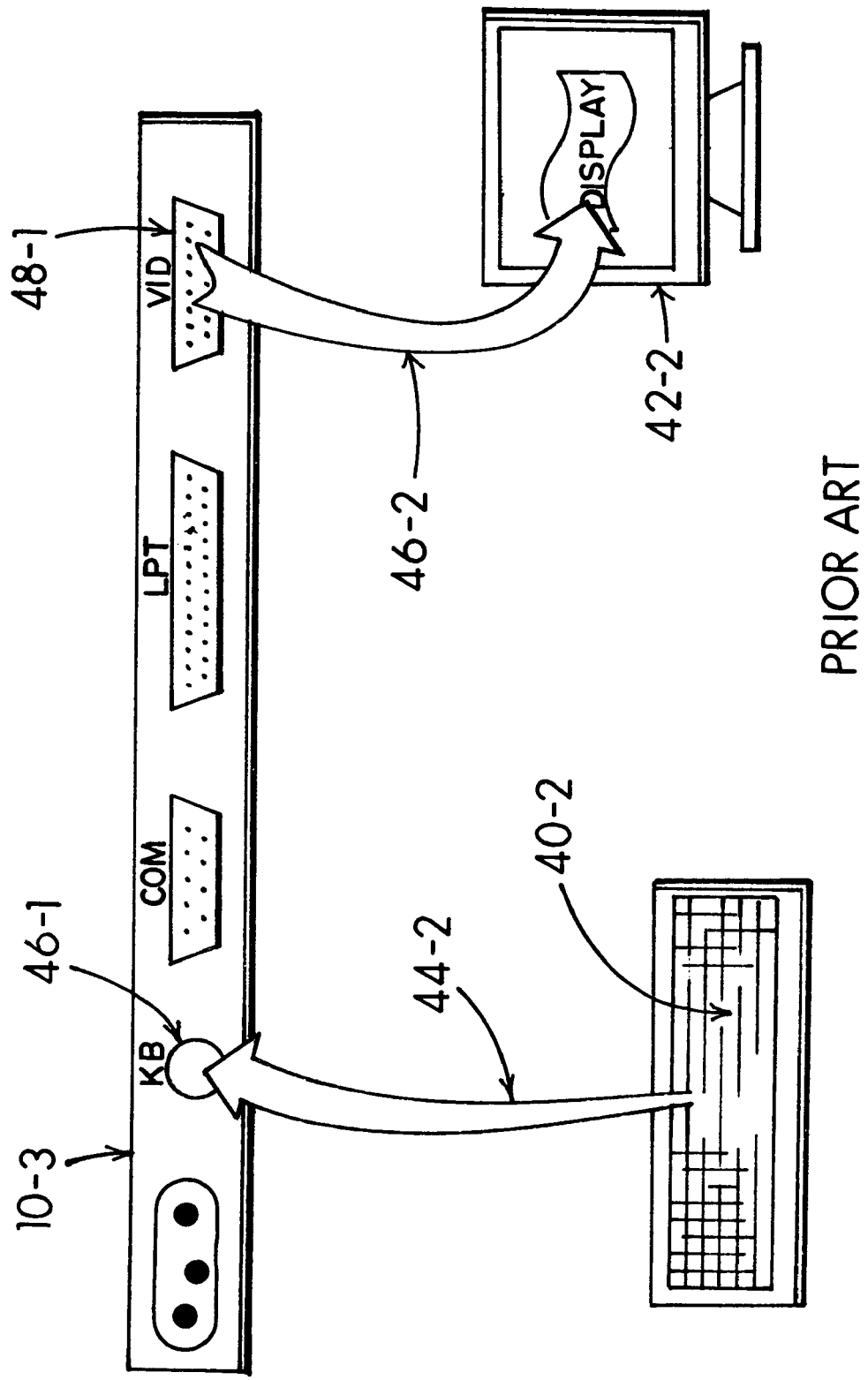
FIG. 4—A rear panel arrangement of a prior art notebook computer having an external keyboard and monitor display provision.

A typical notebook (e.g., portable or laptop) computer 10-3 may include a "back-panel" connector grouping as shown in FIG. 4. In the usual prior art arrangement, an external keyboard 40-2 may be hooked 44-2 into KB a keyboard port 46-1 while a video display signal may be obtained from a VID port (usually 15-pin "mini D-sub") connector 48-1 that couples 46-2 display signals to an external display 42-2.

Figure 5:
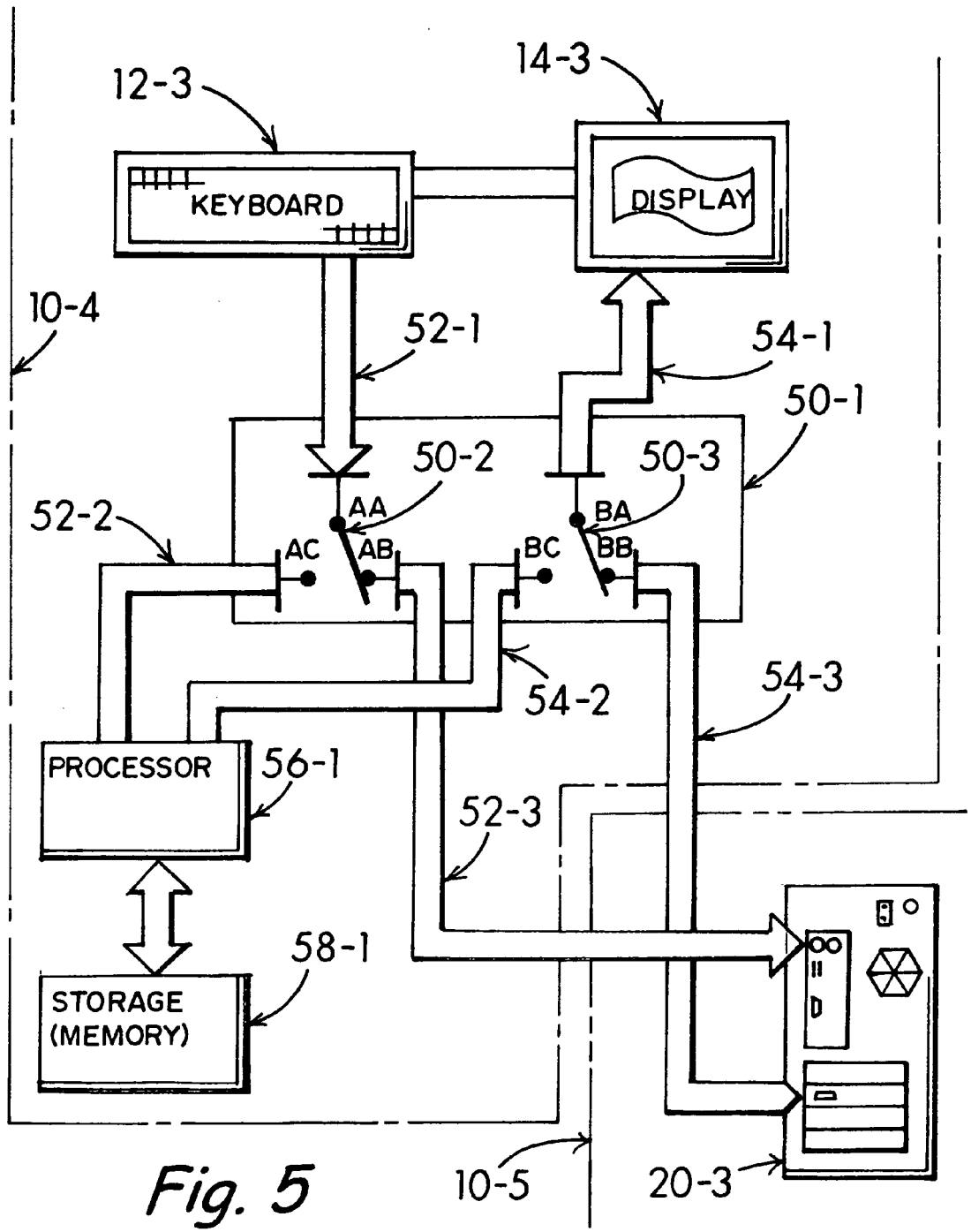
FIG. 5—A notebook computer configurable between a self-contained laptop computer mode and a mode serving as the keyboard and display provision for a desktop computer.

My limn of FIG. 5 gives essentials of a notebook computer within the bounding line 10-4 to include a keyboard 12-3 and display 14-3 sharing the same structure with a processor 56-1 and storage (memory) elements 58-1. In this portrayal, I show a selector 50-1 which may serve to redirect the keyboard 12-3 signal line 52-1 through a mode switcher 50-2 bridging contacts AA-AB to couple 52-3 with the keyboard input port on the back-panel of a desktop computer 20-3. Similarly the display 14-3 portion of the portable computer couples 54-1 to a mode switcher 50-3 bridging contacts BA-BB that directs its coupling 54-3 with the video output provision of the desktop computer 20-3.

Note that alternatively, the mode switchers 50-2, 50-3 may be otherwise set to bridge contacts AA-AC and BA-BC and couple with the processor 56-1 to assume conventional laptop computer operation. This occurs when the keyboard signal bus 52-1 is routed through the mode switcher 50-2 to the processor's keyboard data input line 52-2. Similarly, the mode switcher 50-3 receives a video signal 54-2 from the processor 56-1 and redirects it to the video bus 54-1 and the display 14-3. In this configuration, understand that the "processor" 56-1 includes a memory 58-1 and other logic circuitry essential to the processor's performance.

Understand that my depiction of FIG. 5 enables a portable computer to be duplexed, either as a keyboard and display interface for a desktop computer, or otherwise applied as a usual notebook computer configuration. This is to say, my present invention urges the inclusion of a provision for mode switchover as an integral part of a portable computer, whereby the switchover may be attained either by physical switching, connector exchange, or software command.

Figure 6:
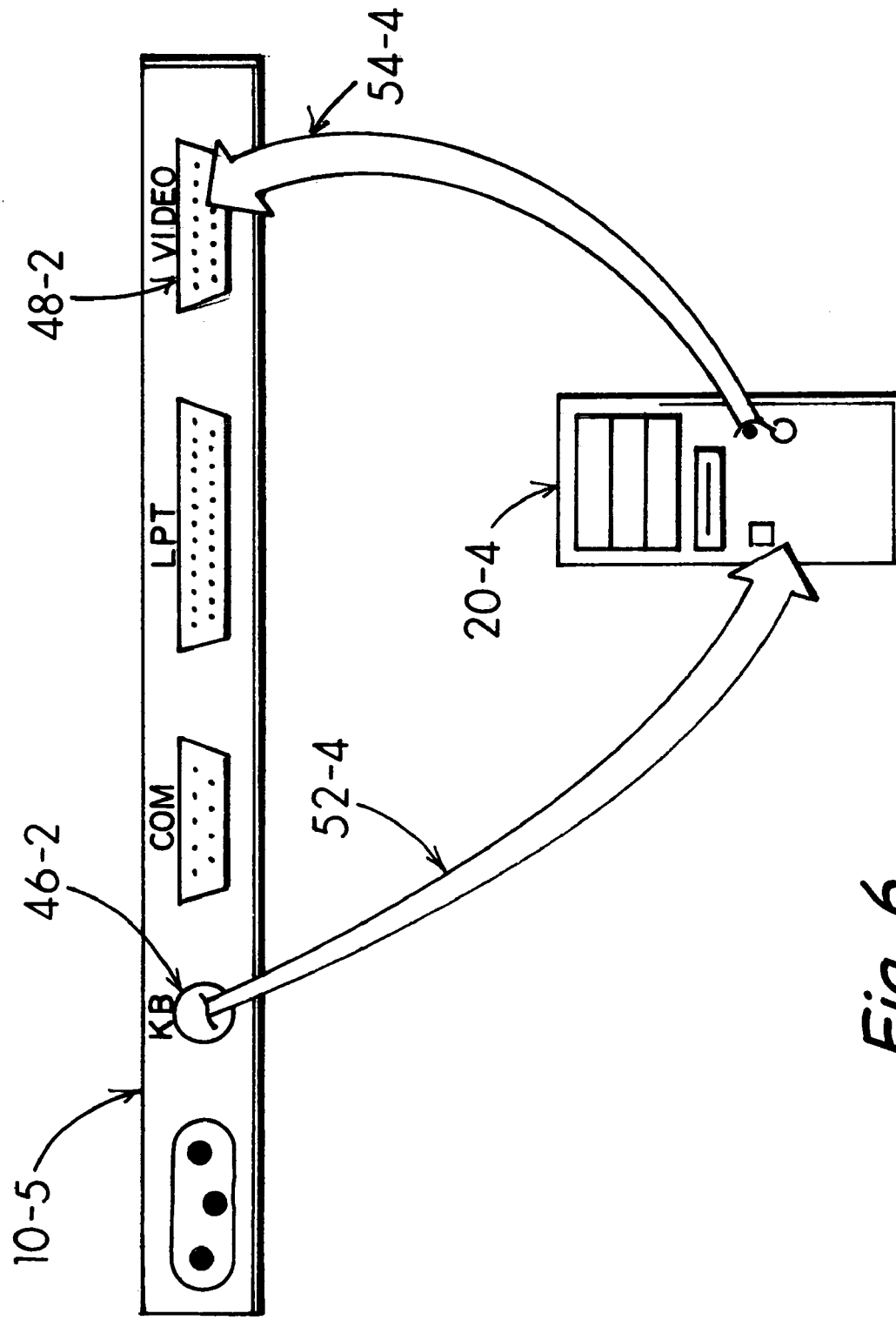
FIG. 6—A rear panel modus operandi arrangement for a notebook computer supporting this inventions teachings.

The rear apron of a typical laptop computer 10-5 appears in FIG. 6 to include a keyboard port 46-2 established to deliver 52-4 the portable computer's keyboard signal to the desktop computer's 20-4 keyboard input terminus port. The desktop computer's video output port is shown coupled 54-4 with a video input port 48-2 configured on the notebook computer 10-5. The result is that the desktop computer 20-4 receives keyboard data signals from the notebook computer, while the video display produced by the desktop computer 20-4 resultingly displays on the notebook computer's usual flat screen display panel.

Figure 7:
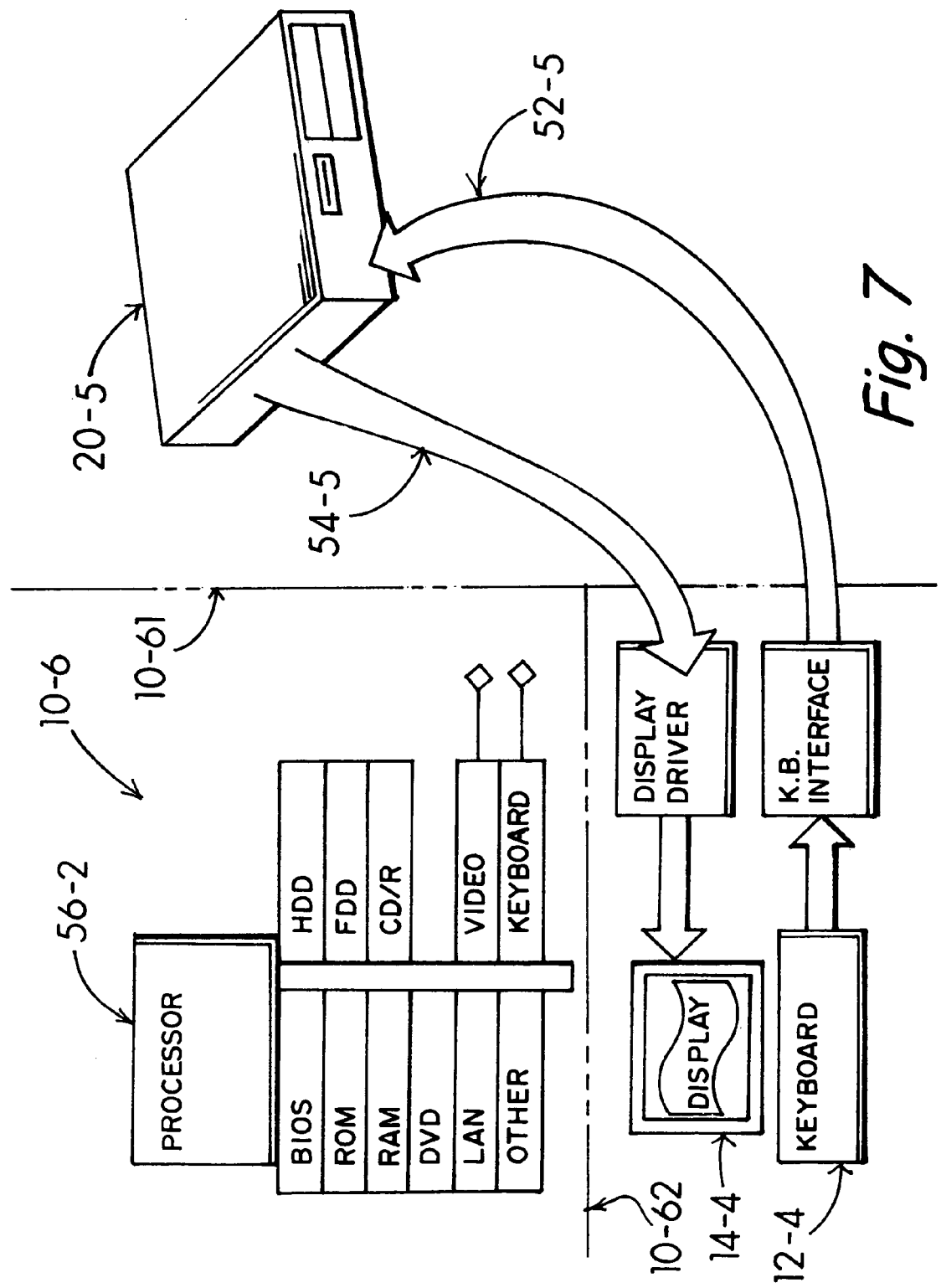
FIG. 7—A showing that a keyboard and display are preferably operated in full isolation from the usual processor and ancillary memory, etc. typical of a notebook computer.

In FIG. 7 I show a desktop computer 20-5, such as a Gateway model E3200 intercoupled with a portable laptop computer generally depicted 10-6 to the left of line 10-61. In this showing, the processor 56-2 and other elements ordinarily found in a laptop computer are depicted above the delineation 10-62 and in a disconnected mode. In other words, the keyboard 12-4 and display 14-4 are maintained operative to exclusively inter-couple 52-5,54-5 with the desktop computer 20-5. As a result, the keyboard 12-4 serves an keyboarded data source and the display 14-4 performs as a GUI for the desktop computer 20-5.

As a general definition, GUI or Graphical User Interface is used for purpose of this invention to include the visual display and the manual keyboard functions of the portable computer. The term may be used for either user interface element (e.g., keyboard and display) in a independent or combinative sense. Artisans also know that portable (notebook) computer keyboards ordinarily provide a "mouse" function as keyboard inclusion and this may be adapted as a part of the manual GUI service afforded by the keyboard.

Figure 8:
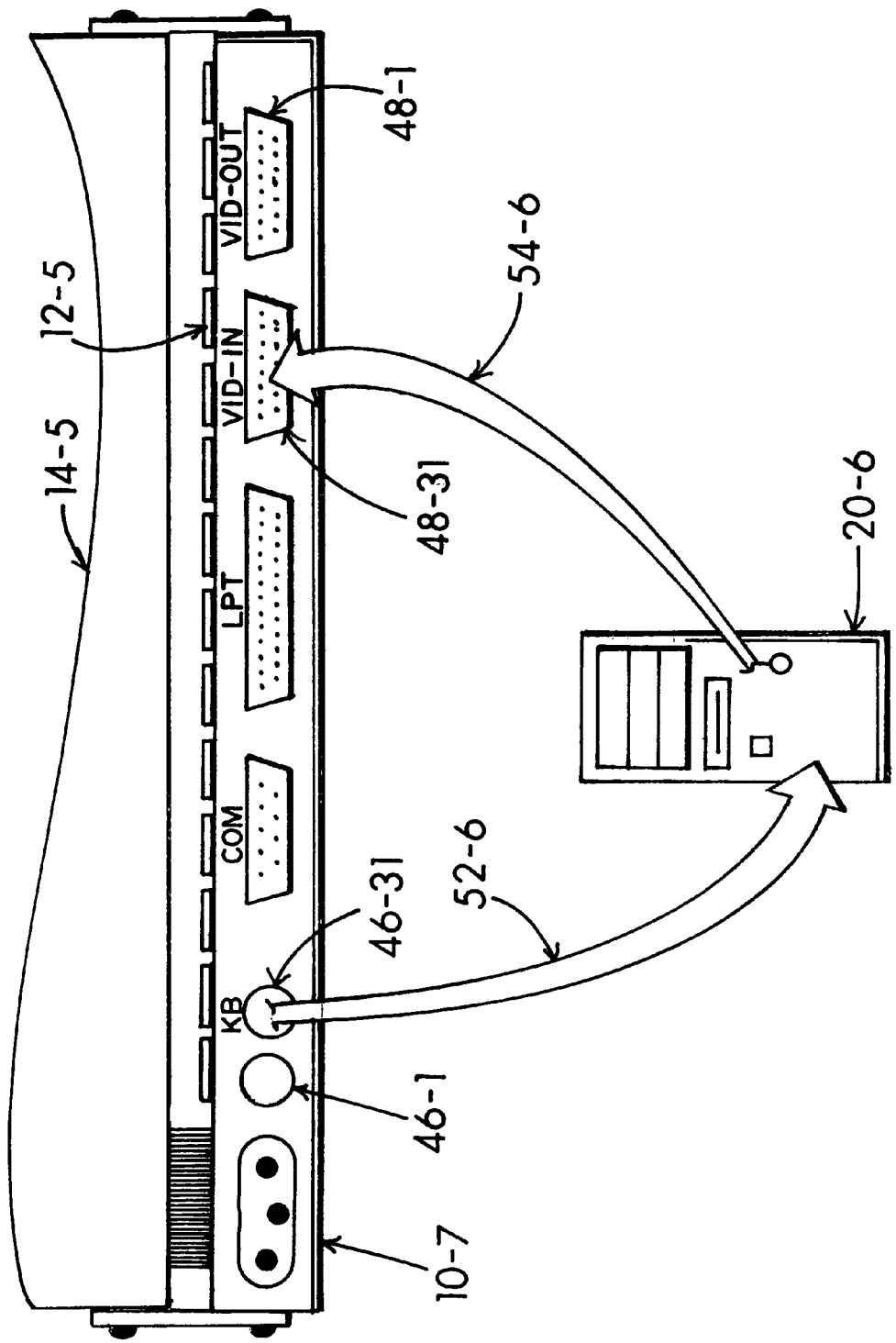
FIG. 8—A showing of separate port connections for outporting the keyboard data signal and in-porting the video display signal in conjunction with a notebook computer.

The limn of FIG. 8 depicts a portable computer 10-7 having a keyboard 12-5 and an affixed display panel 14-5. This depiction shows the rear apron of the notebook computer to include a display output VID-OUT port 48-1 and keyboard input port 46-1 as discussed relative with FIG. 4. In addition, I include a keyboard output KB port 46-31 that may couple 52-6 with the desktop or tower computer 20-6 keyboard input port. Furthermore, a video input VID-IN port 48-31 is presently included for receiving 54-6 video signals from the video output port associated with the desktop computer 20-6. The desired result is that the notebook computer's keyboard 12-5 and display 14-5 may provide the necessitous GUI provision for the desktop computer 20-6.

Figure 9:
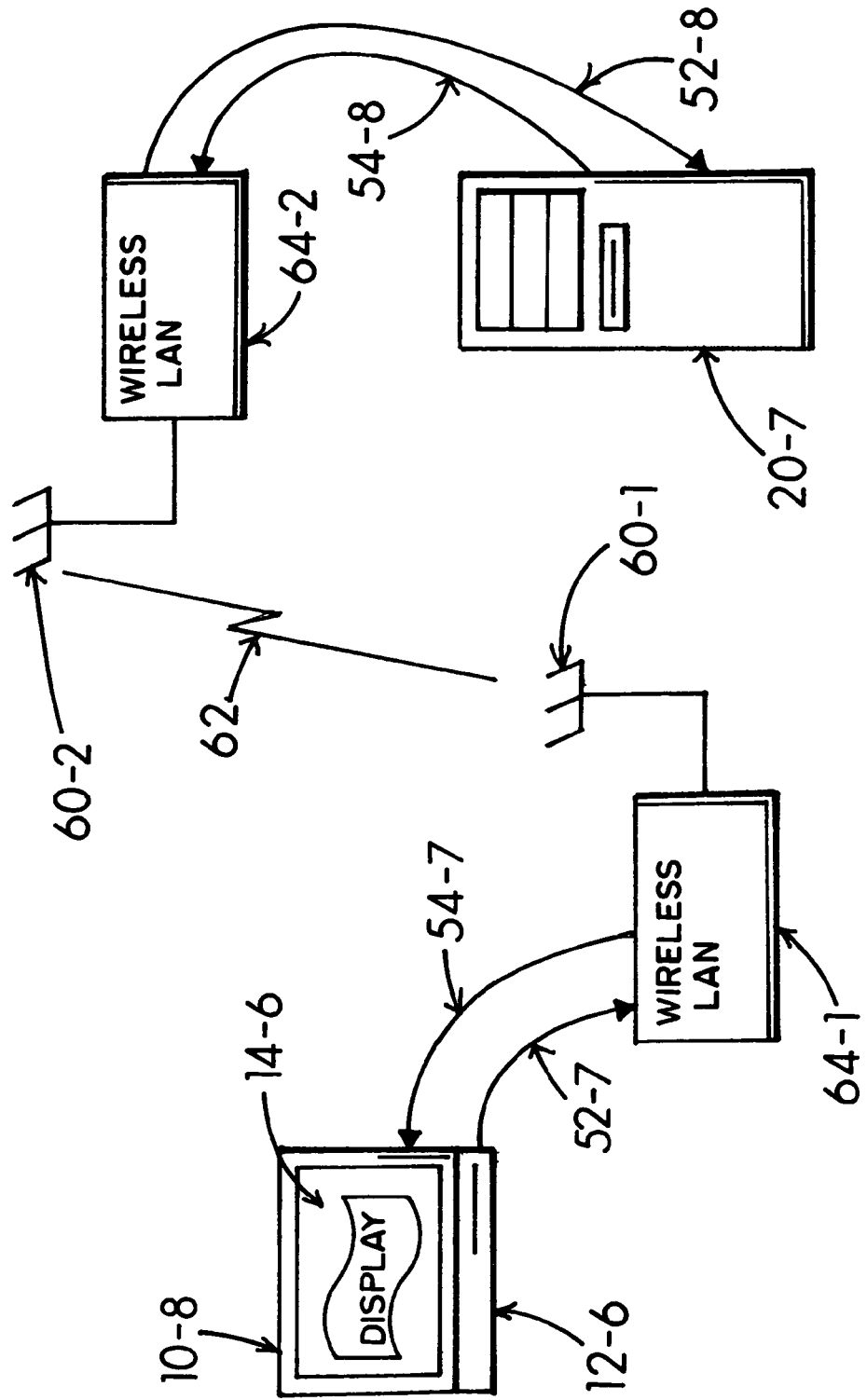
FIG. 9—A local area network (LAN) arrangement for utilizing the keyboard and display portions of a portable computer as GUI devices for a stationary desktop computer.

Now with FIG. 9 I show the use of a wireless interaction between the keyboard 12-6 and display 14-6 portions of the notebook computer 10-8 by coupling the keyboard data line to the wireless LAN 64-1 and coupling the video signal from the wireless LAN 64-1 to the flatpanel display 14-6.

The wireless coupling 62 of data signals is attained between the antennae 60-1,60-2. As shown, the desktop computer 20-7 receives 52-8 keyboard data signals from the wireless LAN interface 64-2 and further delivers video data signals 54-8 to the LAN interface.

It is the absolute unbridled intent of this invention to provide the desktop computer with a user interface, including at least a display and a keyboard, that are unitized into a single compact package. The intent is to utilize the space-saving efficient form of the integrated display and keyboard configuration typified by a notebook style of portable computer to garner a substantial saving of valuable workstation space. It shall be realized that in the depiction of FIG. 7 all the elements left of the delineation 10-61 and above the delineation 10-62 are not necessary in the practice of this invention, since only the keyboard, display and associated interface elements are utilized.

Practice Caveats

A reasonable and comprehensive effort has been made to explain this invention in a manner which enables a person of quite ordinary skill in the art to efficiently duplicate my findings. The utter essence of my invention is to absolutely and remarkably conserve work-space by utilizing a less bulky GUI configuration for a conventional desktop computer. The invention teaches how the unitized keyboard and display portions of a typical notebook configuration may be advantageously used with the desktop computer. The smaller footprint of the laptop computer configuration as compared with the space taken by a separate keyboard and display terminal obviously conserves valuable workstation space.

I fully expect that a skilled artisan may develop alternate details for my invention's implementation including a considerable variation regarding physical form details, electronic data-signal inter-coupling, connection interface, software and firmware configuration and obvious operational preferences. I say that these variants naturally occur as an obvious outspread from the invention's central novelty and practicable examples. Such variants result from mere applied engineering skill coupled with an ever-increasing plethora of options regarding componential elements, techniques and programming skills which may be utilized to duplicate my invention's contribution to the art-field.

Any attempt by another to circumvent the essence of my invention to utilize a notebook computer's structure as a unitized apparatus providing a full-capability keyboard and flat-screen display shall be prudently viewed with caution and suspicion. I realize that hindsight cleverness may suggest other physical and technical embodiments exhibiting a difference in operational detail from that which I specifically depict to become readily apparent to and subsequently tried by others. As a consequence to this realization, all technical hookup, signal processing and physical embodiment variations irrespective of their extent are merely natural and obvious extensions of the invention's central teachings, insofar as they satisfy the described functionality intent of my invention. In particular this includes consolidating the full-function keyboard and GUI display as a unitized monopackage configuration. Any scheme which satisfies this objective of my invention shall be found as merely obvious modifications of or extensions to the rudiments of my invention's fundamental teachings. Obvious engineering refinements, embodiment practices and operational details shall be construed to be irrefutably within the scope of my invention as presently taught and inclusively claimed.

I claim for my invention:

1. A computer user-interface method comprising:
    conjoining a portable keyboard and a portable display to provide an integrated user interface;
    commanding a stationary computer directly from keyboard data signals produced by the portable keyboard by linking the keyboard data signals directly to a keyboard data signal in-port of the stationary computer;
    viewing the video data signal ported directly from the stationary computer on the portable display by linking the video data display signal directly into a video data signal in-port of the portable display;
    whereby user command of the stationary computer is accessed by the portable keyboard and rendered on the portable display.

2. The computer user-interface method of claim 1 further comprising:
    the portable keyboard and the portable display may comprise a corresponding keyboard and display of a portable computer;
    first accessing the keyboard of the portable computer to service the linking of the keyboard command signals directly to the stationary computer;
    second accessing the display of the portable computer to render the video display signal directly linked from the stationary computer;
    whereby the user-interface with the stationary computer is implemented by linking data signals associated with the keyboard and display of the portable computer directly with the stationary computer.

3. The computer user-interface method of claim 2 further comprising:
    a first wireless linking of command signals from the portable keyboard directly to the stationary computer;
    a second wireless linking of the video display signal directly from the stationary computer to the portable display;
    whereby the command signals originated from the portable keyboard may be sent to control the stationary computer and the video display signals originated from the stationary computer may be sent to the portable display for rendering of viewable data processed by the stationary computer.

4. The computer user-interface method of claim 1 further comprising:
    including a mouse device integral with the integrated assemblage;
    outputting mouse device movement-data signals directly to a mouse in-port of the stationary computer;
    whereby the user command of the stationary computer is complemented by the mouse device movement-data signals.

5. The computer user-interface method of claim 1 further comprising:
    establishing a direct external port access to the portable keyboard and portable display portions of a laptop or notebook style of portable computer;
    duplexing functionality of the portable computer to selectively operate in at least one mode of:
        i. a fully functional notebook or laptop portable computer configuration; and,
        ii. porting the output of the portable keyboard's data signal bus directly to the keyboard data signal in-port of the stationary computer and linking the video data signal from the stationary computer directly into the video data signal in-port of the portable display
    whereby the portable computer may be duplexed to operate in a first mode as a conventional portable computer or alternatively in a second mode as a computer user interface for coupling with the stationary computer.

6. The computer user-interface method of claim 5 further comprising:
reconfigurating ancillary port provisions of the portable computer to at least include:
first reversing a usual video signal output port to conversely operate as a video data signal in-port for the direct linking of the video data signals from the stationary computer for rendering on the portable display;
second reversing a usual external keyboard data signal in-port to conversely operate as keyboard data signal out-port to directly link the keyboard data signals to the stationary computer;
whereby the ancillary port provisions may be advantageously utile in either of the duplexed function modes established for the portable computer.

7. The computer user-interface method of claim 1 further comprising:
adapting a portable computer to at least temporarily provide the portable display and portable keyboard elements of the computer user interface;
disabling the data-processing and storage portions of the portable computer;
outputting the keyboard data signal produced by a user's interaction with the portable keyboard to be directly linked to the keyboard data signal in-port of the stationary computer; and,
coupling the video data signal produced by the stationary computer to be directly linked to a video in-port of the portable display;
whereby the user's interaction with the portable keyboard and viewing of data presentation on the portable display services the essence of the computer user interface used in conjunction with the stationary computer.

8. The computer user-interface method of claim 1 further comprising:
configurating the integrated user interface to include USB porting;
outputting keyboard data signals for the direct linking to the stationary computer through the USB porting;
inputting the video data signals directly linked from the stationary computer through the USB porting for rendering on the portable display;
whereby an intercoupling of the integrated user interface and the stationary computer may be maintained utilizing USB data signal porting.

9. A computer user-interface method comprising:
a portable keyboard and a portable display conjoined into an integrated user interface for a stationary computer;
selecting at least one of two operative modes, including:
a first mode linking a keyboard data output signal developed by the portable keyboard directly to a keyboard data signal in-port of the stationary computer;
a second mode linking a video data signal directly from the video data signal out-port of the stationary computer to the video data signal in-port of the portable display;
whereby at least one of the portable keyboard and the portable display may be linked with the stationary computer.

10. The computer user-interface method of claim 9 further comprising:
the portable keyboard and the portable display may comprise a corresponding keyboard and display of a portable computer;
first accessing the keyboard of the portable computer to out-port the first mode linking of the keyboard data signal directly to the keyboard data signal in-port of the stationary computer; and,
second accessing the display of the portable computer to in-port the second mode linking of the video signal directly from the video signal data out-port the stationary computer;
whereby the portable computer may provide the keyboard and display functions utile as the integrated user interface for the stationary computer.

11. The computer user-interface method of claim 9 further comprising:
adapting a keyboard and display portion of a portable computer to effectuate the portable keyboard including a keyboard data signal out-port and the portable display including a video data signal in-port;
first directly linking the keyboard data signal out-port to the keyboard data signal in-port of the stationary computer;
second directly linking the video data signal in-port to the video data signal in-port of the portable computer;
whereby the portable computer may be adaptively serviceable as the integrated user interface for the stationary computer.

12. The computer user-interface method of claim 11 further comprising:
reconfigurating ancillary port provisions of the portable computer to at least include:
first reversing a video data signal out-port to conversely operate as the video data signal in-port for the linking of video data signals from the stationary computer for rendering on the portable display; and,
second reversing an external keyboard data signal in-port to conversely operate as a keyboard data signal out-port for the linking of the keyboard data signals to the stationary computer;
whereby the portable computer's ancillary port provisions may be advantageously reconfigured for adapting the portable computer as an integrated user interface for the stationary computer.

13. The computer user-interface method of claim 11 further comprising:
duplexing functionality of the portable computer to selectively operate in at least one mode of:
i. a fully functional notebook or laptop portable computer configuration; and,
ii. porting the portable keyboard's data signal bus and portable display's video signal bus with correspondent data signal ports on the stationary computer;
whereby the portable computer may be duplexed to operate as a conventional portable computer or alternatively as the integrated user interface for the stationary computer.

14. The computer user-interface method of claim 9 further comprising:
including a mouse device integral with the integrated user interface;
outputting user induced mouse data signals directly to a mouse data signal in-port of the stationary computer;
whereby a mouse function is provided in an operative combination with the portable keyboard for inputting the mouse data signals directly to the stationary computer.

15. The computer user-interface method of claim 9 further comprising:
the integrated user interface including USB interfacial data signal porting coupled with the portable keyboard and the portable display;

intercoupling the USB interfacial data signal porting with a counterpoint USB data signal porting included in the stationary computer;

outputting keyboard data signals produced by the portable keyboard and coupled through the USB interfacial data signal porting for directly linking to a counterpoint USB data signal porting on the stationary computer;

inputting video data signals delivered from the stationary computer through the counterpoint USB data signal porting to the USB interfacial data signal porting coupled with the portable display;

whereby a flow of the keyboard data signals and the video data signals may be maintained by the USB interfacial data signal ports directly linking the keyboard and video data signals with the counterpoint USB data signal ports on the stationary computer.

16. A computer user-interface means comprising:

a portable user-interface comprising a portable display conjoined with a portable keyboard;

an preferential interface setting means for engaging at least one of:
  i. first independent access to keyboard data signals produced by the portable keyboard for directly linking with a keyboard data signal in-port of a stationary computer;
  ii. second independent access to the portable display for rendering a display of video data signal information directly linked from a video data signal out-port of the stationary computer;

whereby a conjoined embodiment of the portable keyboard and the portable display of the portable computer may be independently utilized to command keyboard control of the stationary computer and to render display of video data signals provided by the stationary computer.

17. The computer user-interface means of claim 16 further comprising:

a mouse-device complementing the portable keyboard means;
  third independent access to mouse-device movement data signals produced by the mouse-device for directly linking to the mouse-device data signal in-port of the stationary computer;

whereby the portable user-interface includes a direct linkage of the mouse-device movement data signal for commanding the stationary computer.

18. The computer user-interface means of claim 16 further comprising:

a portable computer including the portable keyboard and the portable display;

disablement means for silencing operation of portions of the portable computer determined as nonessential for independent utilization of the portable keyboard and the portable display;

whereby the portable keyboard and the portable display of the portable computer may be independently utilized as the portable user-interface in conjunction with the stationary computer.

19. The computer user-interface means of claim 18 further comprising:

a portable computer including the portable keyboard and the portable display;

a first independent access to the portable keyboard including a keyboard data signal out-port for directly linking the keyboard data signals to the stationary computer;

A second independent access to the portable display including a video data signal in-port for directly linking the video data signals from the stationary computer;

whereby the portable keyboard and the portable display portions of the portable computer may be utile to provide user-interface command of the stationary computer and render video information produced by the stationary computer.

20. The computer user-interface means of claim 19 further comprising:

a mode selection means for establishing the portable computer to usually provide one of the modes including:
  i. a first mode comprising usual operation of the portable computer with its full complement of operational computer-performance capabilities;
  ii. a second mode wherein computational and storage functions of the portable computer are silenced with the keyboard data signal produced by operation of the keyboard is directly linked to the stationary computer and the video display signal directly linked from the stationary computer is rendered on the portable display;

whereby the portable computer may be adapted to independently function as the portable user-interface for the user command and the display rendering of data signal interchange directly linked between the stationary computer and the portable computer.

* * * * *